(12) United States Patent
Brown et al.

(10) Patent No.: US 7,702,676 B2
(45) Date of Patent: *Apr. 20, 2010

(54) PARALLEL VIRTUAL OPTIMIZATION

(75) Inventors: Douglas P. Brown, Rancho Santa Fe, CA (US); Scott E. Gnau, Escondido, CA (US); John Mark Morris, San Diego, CA (US)

(73) Assignee: Teradata US, Inc., Miamisburg, OH (US)

( * ) Notice: Subject to any disclaimer, the term of this patent is extended or adjusted under 35 U.S.C. 154(b) by 433 days.

This patent is subject to a terminal disclaimer.

(21) Appl. No.: 11/716,892

(22) Filed: Mar. 12, 2007

(65) Prior Publication Data

US 2008/0162419 A1 Jul. 3, 2008

Related U.S. Application Data

(60) Provisional application No. 60/877,767, filed on Dec. 29, 2006, provisional application No. 60/877,766, filed on Dec. 29, 2006, provisional application No. 60/877,768, filed on Dec. 29, 2006, provisional application No. 60/877,823, filed on Dec. 29, 2006.

(51) Int. Cl.
*G06F 17/30* (2006.01)

(52) U.S. Cl. .................. 707/713; 707/718; 707/721; 707/764; 707/765

(58) Field of Classification Search .................. 707/1, 707/2, 3, 4, 5
See application file for complete search history.

(56) References Cited

U.S. PATENT DOCUMENTS

| | | | |
|---|---|---|---|
| 6,351,749 B1* | 2/2002 | Brown et al. | 707/10 |
| 6,721,735 B1* | 4/2004 | Lee | 707/5 |
| 7,346,401 B2* | 3/2008 | Diao et al. | 700/28 |
| 2003/0212668 A1* | 11/2003 | Hinshaw et al. | 707/3 |
| 2004/0098300 A1* | 5/2004 | Karwatowski et al. | 705/11 |
| 2005/0050095 A1* | 3/2005 | Hurtis et al. | 707/104.1 |
| 2005/0144323 A1* | 6/2005 | Gardos et al. | 709/245 |
| 2005/0268063 A1* | 12/2005 | Diao et al. | 711/170 |
| 2006/0063575 A1* | 3/2006 | Gatto et al. | 463/1 |
| 2006/0080285 A1* | 4/2006 | Chowdhuri | 707/3 |
| 2006/0218123 A1* | 9/2006 | Chowdhuri et al. | 707/2 |
| 2009/0006468 A1* | 1/2009 | Shankar et al. | 707/103 Y |

* cited by examiner

*Primary Examiner*—Don Wong
*Assistant Examiner*—Thanh-Ha Dang
(74) *Attorney, Agent, or Firm*—Gates & Cooper LLP (57) ABSTRACT

A system and method for managing a domain comprised of a plurality of database systems, wherein each of the database systems performs database queries to retrieve data stored by the database systems. There are one or more virtual regulators for managing the domain and one or more closed-loop system management (CLSM) regulators for managing each of the database systems in the domain. Both the virtual regulators and CLSM regulators perform parallel virtual optimization of the database queries performed by the database systems.

18 Claims, 6 Drawing Sheets

PARALLEL VIRTUAL OPTIMIZATION

CROSS REFERENCE TO RELATED APPLICATIONS

This application claims the benefit under 35 U.S.C. §119 (e) to the following and commonly assigned applications:

U.S. Provisional Patent Application Ser. No. 60/877,767, filed on Dec. 29, 2006, now abandoned by Douglas P. Brown, Anita Richards, John Mark Morris and Todd A. Walter, and entitled Virtual Regulator for Multi-Database Systems;

U.S. Provisional Patent Application Ser. No. 60/877,766, filed on Dec. 29, 2006, now abandoned by Douglas P. Brown, Scott Gnau and John Mark Morris, and entitled Parallel Virtual Optimization;

U.S. Provisional Patent Application Ser. No. 60/877,768, filed on Dec. 29, 2006, now abandoned by John Mark Morris, Anita Richards and Douglas P. Brown, and entitled Workload Priority Influenced Data Temperature; and U.S. Provisional Patent Application Ser. No. 60/877,823, filed on Dec. 29, 2006, now abandoned by John Mark Morris, Anita Richards and Douglas P. Brown, and entitled Automated Block Size Management for Database Objections;

all of which applications are incorporated by reference herein.

This application is related to the following co-pending and commonly assigned applications:

U.S. Utility patent application Ser. No. 10/730,348, filed Dec. 8, 2003, by Douglas P. Brown, Anita Richards, Bhashyam Ramesh, Caroline M. Ballinger and Richard D. Glick, and entitled Administering the Workload of a Database System Using Feedback;

U.S. Utility patent application Ser. No. 10/786,448, filed Feb. 25, 2004, by Douglas P. Brown, Bhashyam Ramesh and Anita Richards, and entitled Guiding the Development of Workload Group Definition Classifications;

U.S. Utility patent application Ser. No. 10/889,796, filed Jul. 13, 2004, by Douglas P. Brown, Anita Richards, and Bhashyam Ramesh, and entitled Administering Workload Groups;

U.S. Utility patent application Ser. No. 10/915,609, filed Aug. 10, 2004, by Douglas P. Brown, Anita Richards, and Bhashyam Ramesh, and entitled Regulating the Workload of a Database System;

U.S. Utility patent application Ser. No. 11/468,107, filed Aug. 29, 2006, by Douglas P. Brown and Anita Richards, and entitled A System and Method for Managing a Plurality of Database Systems, which applications claims the benefit of U.S. Provisional Patent Application Ser. No. 60/715,815, filed Sep. 9, 2005, by Douglas P. Brown and Anita Richards, and entitled A System and Method for Managing a Plurality of Database Systems;

U.S. Utility patent application Ser. No. 11/716,889, filed on Mar. 12, 2007, by Douglas P. Brown, Anita Richards, John Mark Morris and Todd A. Walter, and entitled Virtual Regulator for Multi-Database Systems;

U.S. Utility patent application Ser. No. 11/716,880, filed on Mar. 12, 2007, by John Mark Morris, Anita Richards and Douglas P. Brown, and entitled Workload Priority Influenced Data Temperature; and U.S. Utility patent application Ser. No. 11/716,890, filed on Mar. 12, 2007, by John Mark Morris, Anita Richards and Douglas P. Brown, and entitled Automated Block Size Management for Database Objections;

all of which applications are incorporated by reference herein.

BACKGROUND OF THE INVENTION

1. Field of the Invention

The present invention relates to a system and method for optimizing database queries.

2. Description of Related Art

As database management systems (DBMS) continue to increase in function and expand into new application areas, the diversity of database workloads is increasing as well. In addition to the classic relational DBMS workload consisting of short transactions running concurrently with long decision support queries, workloads comprising of an even wider range of system demands are emerging. New complex data types, such as image files, audio files, video files and other large objects, and new active data warehouse requirements, such as capacity on demand, data replication, fault-tolerance, dual active query processing, recursion, user defined types (UDFs), external UDFs, and so on, result in widely varying memory, processor, disk and network demands on database systems.

In general, a DBMS has a number of operational characteristics. These include physical statistics, such as CPU usage, query response times and performance statistics. In some DBMS, the operational characteristics include rule sets under which the database operates, relating to the likes of resource consumption and request prioritization. Varying these rule sets often has an effect on other physical characteristics, for example altering performance statistics. Ideally, a DBMS should be able to accept performance goals for a workload and dynamically adjust its own performance based on whether or not these goals are being met.

Closed-loop system management (CLSM) is a technology directed towards this ideal. Under some known CLSM-type systems, incoming queries are split into workload groups, each workload group having respective service level goals (SLGs). The DBMS is responsive to whether or not these goals are met for selectively switching between predetermined rule sets or adjusting performance controls.

It is also known to operate multi-system environments, wherein a plurality of databases, database systems, or DBMS operate in parallel. For example, DBMS that use a Massively Parallel Processing (MPP) architecture across multiple systems or a Symmetric Multiprocessing (SMP) architecture. In particular, it is known to operate a "dual-active" system wherein a plurality of databases operate in parallel and intercommunicate. It will be appreciated that managing complex workloads and performance goals performance objectives across the board in a multi-system environment is difficult.

Moreover, query optimization in multi-system environments can be a time consuming compute-intensive task. High performance optimizers are designed to do an intelligent search of a query execution plan space within a limited wall clock time budget, so as to enable query time SLG conformance. In some cases, better query execution plans might be identified, if more plans could be explored within the time budget.

Consequently, there is still a need in the art for additional management techniques for use in multi-system environments. Specifically, there is a need for systems that can make more thorough explorations of optimized query execution plans. The present invention satisfies this need.

SUMMARY OF THE INVENTION

To overcome the limitations in the prior art described above, and to overcome other limitations that will become apparent upon reading and understanding the present specification, the present invention discloses a system and method for managing a domain comprised of a plurality of database systems, wherein each of the database systems performs database queries to retrieve data stored by the database systems. There are one or more virtual regulators for managing the domain and one or more closed-loop system management (CLSM) regulators for managing each of the database systems in the domain. Both the virtual regulators and CLSM regulators perform parallel virtual optimization of the database queries performed by the database systems.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

The present invention discloses CLSM and Virtual Regulators that use DBMS and CLSM technologies to manage workloads in a domain comprised of multiple database systems. Specifically, the Virtual Regulator has the capability to manage workloads across a domain comprised of multiple systems managed by one or more CLSM regulators in order to achieve a set of SLGs. In addition, both the Virtual and CLSM Regulators may perform parallel virtual optimization of queries that comprise the workloads.

System Description

Figure 1:
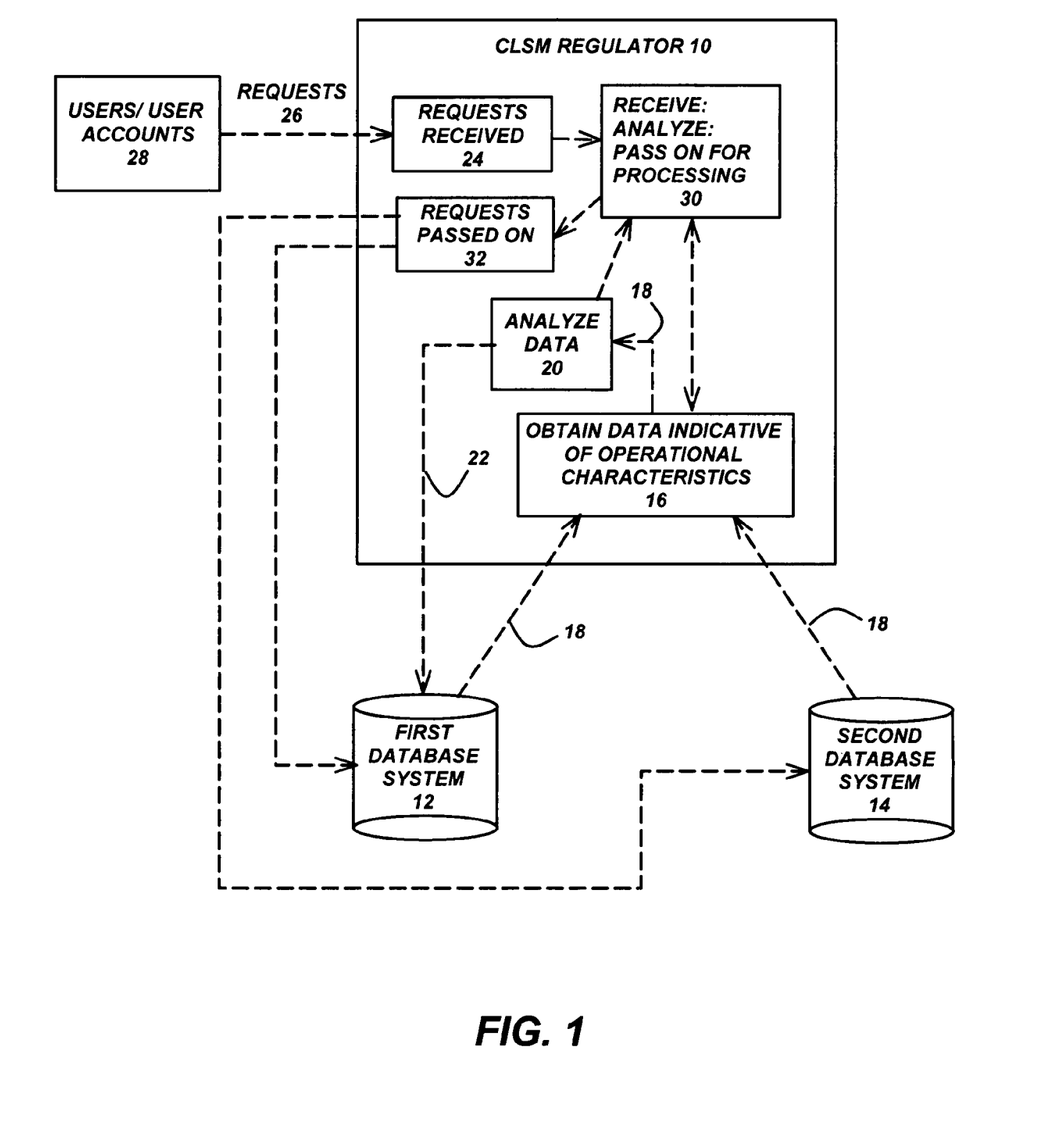
FIG. 1 is a block diagram that illustrates the operation of a CLSM regulator according to the preferred embodiment of the present invention.

Referring initially to FIG. 1, there is provided a CLSM Regulator 10 for managing a plurality of database systems 12 and 14. The CLSM Regulator 10 includes an interface 16 for obtaining data 18 indicative of one or more operational characteristics of each of database system 12 and 14. A monitor 20 analyzes the data 18 and provides a signal 22 indicative of an instruction to adjust one or more of the operational characteristics of a selected one of database systems 12 and 14.

In the present disclosure, the term "database systems" is used in a general sense, and is meant to include the wider range of components used in conjunction with a database in a database system. In some embodiments, database systems 12 and 14 are simple tables of data, whereas in other embodiments they include complex relational database management systems (RDBMS). An example of such a database system 12 or 14 is the Teradata® RDBMS sold by NCR Corporation, the assignee of the present invention.

At a high level, the CLSM Regulator 10 operates as a controller including a feedback response mechanism for a domain defined by a plurality of database systems 12 and 14. It is responsive to the performance of the domain insofar as database requests 24 are performed within predefined threshold requirements. The CLSM Regulator 10 is responsive to data 18 indicative of this performance for adjusting settings, such as resource consumption rules and query prioritization settings, in the database systems 12 and 14. In many embodiments, this is used to better ensure that the available resources are utilized in a manner conducive to efficiently processing a variable workload.

It will be appreciated that the terms "workload class" (WC), "workload group" (WG) and "workload definition" (WD) are substantially synonymous. That is, the terms each relate to the same general identification structure used to separate requests for prioritization, processing and performance monitoring in a database system 12 or 14 including a CLSM Regulator 10.

In the present example, the CLSM Regulator 10 analyzes the performance of each of the database systems 12 and 14 and adjusts their respective operational characteristics in response to the analysis. The analysis includes determining whether a particular class of queries are processed in accordance with one or more SLGs assigned to that class of queries.

In brief, the CLSM Regulator 10 separates incoming queries into workload groups for each database system 12 and 14 in accordance with predefined principles. Each workload group has assigned to it one or more respective SLGs. Each database system 12 and 14 maintains logs and obtains data to determine whether or not SLGs are being met for particular workload groups, and makes adjustments to operational characteristics in response. The typical objective is to adjust available settings such that the SLGs are met.

The precise nature of how workload groups are defined and settings adjusted is generally beyond the scope of the present disclosure, and various aspects are dealt with in detail in the cross-referenced applications set forth above. Other embodiments are used with database systems that use alternate architectures to analyze their performance and inherently adjust their respective operational characteristics in response to the analysis.

As noted above, in some CLSM-type systems, incoming queries are split into workload groups, wherein each workload group has its respective SLGs. The DBMS may be responsive to whether or not these goals are met for selectively switching between predetermined working values defined within a rule set or adjusting performance controls.

In this regard, the full set of workload definitions as well as filters, throttles and priority scheduler settings are considered a "rule set" for the system.

For "normal operating procedures", one set of behaviors defined for a rule set can generally manage workloads and system performance well. For example, when arrival rates per workload are in anticipated ranges, and all system components are up and functioning, a workload manager's the management of CPU, concurrency and workload exceptions can effectively manage workload performance. However, external or system-wide events can cause workload performance to stray beyond reasonable levels.

In addition, the business environment can impose restrictions on the system's performance. In the present invention, a database administrator (DBA) has the ability to specify different behaviors depending on the current situation. This is done through the definition of a two-dimensional state matrix of system conditions (SysCons) and operating environments (OpEnvs).

A sample matrix is illustrated below:

State Matrix

| System Conditions | Operating Environments | |
|---|---|---|
| | Interactive | Batch |
| Green | Interactive State | Batch State |
| Yellow | Interactive Yellow State | Batch State |
| Red | Interactive Red State | Batch State |

A System Condition (SysCon) represents the "condition" or "health" of the system, e.g., degraded to the "red" system condition because a node is down.

An Operational Environment (OpEnv) represents the "kind of work" that the system is being expected to perform, e.g., within the batch operational environment, because a load job is executing.

The elements of the State Matrix are <SysCon, OpEnv> pairs. Each State Matrix element references a State. Multiple matrix elements may reference a common State. Only one State is in effect at any given time, based on the matrix element referenced by the highest severity SysCon and the highest precedence OpEnv in effect. Many <SysCon, OpEnv> pairs correlate to fewer States. Each State has a Working Value Set. A <SysCon, OpEnv> or the State can change as directed by event directives defined by the DBA.

In the present example, operational characteristics include performance statistics, rule sets (e.g., working values) under which a database system 12 or 14 is operating, physical attributes, and so on.

Some particular examples are set out below:

Memory—the amount of system and subsystem memory currently being used. It is possible that the system will include some memory that is shared among all of the subsystems.

The number of available access module processor (AMP) worker tasks (AWTs)—an AMP is a module within a database system 12 or 14 that performs a task, and an AWT is a thread or task within an AMP for performing the work assigned by a dispatcher. Each AMP has a predetermined number of AWTs in a pool available for processing. When a task is assigned to an AMP, one or more AWTs are assigned to complete the task. When the task is complete, the AWTs are released back into the pool. As an AMP is assigned tasks to perform, its available AWTs are reduced. As it completes tasks, its available AWTs are increased.

File SeGment (FSG) Cache—the amount of FSG cache that has been consumed. The FSG cache is physical memory that buffers data as it is being sent to or from the data storage facilities.

Arrival rates—the rate at which requests are arriving. Arrival rates are often broken down and used as a resource management tool on a workload basis.

Co-existence—the co-existence of multiple types of processors and or processor types.

Skew—the degree to which data (and therefore processing) is concentrated in one or more AMPs as compared to the other AMPs.

Blocking/locking—the degree to which data access are blocked or locked because other processes are accessing data.

Spool—the degree of consumption of disk space allocated to temporary storage.

Missed SLGs.

Node, cpu, memory, disk, channel, network and interconnect failures.

The CLSM Regulator 10 includes an input 24 for receiving a request 26 from a user 28. Although user 28 is illustrated as a person, it will be appreciated that various hardware and software devices also provide requests 26.

Request 26 is typically a database query, such as a tactical query. In the present embodiment, database systems 12 and 14 define a dual-active system where either database system 12 or 14 is capable of handling a request 26. Despite this, it will be appreciated that one of the database systems 12 or 14 is often able to handle a request 26 more efficiently given its operational characteristics. As such, a processor 30 is responsive to interface 24 for selecting one of database systems 12 or 14, or both database systems 12 and 14, to process a received request 26.

An output 32 provides the request the selected database system 12 or 14 for processing. In FIG. 1, output 32 is shown to be providing requests to both database systems 12 and 14. This is meant to illustrate the provision of at least two discrete requests, as well as a single request, being provided to both database systems 12 and 14.

In the present embodiment, output 32 provides request 26 to database systems 12 and 14 in accordance with a predetermined query prioritization protocol, such as that administered by an implementation of a Priority Scheduler Facility (PSF) or a similar component. Monitor 20 adjusts this predetermined query prioritization protocol in response to data 18. For example, in an embodiment where PSF is used, monitor 20 adjusts the PSF settings, such a class weights.

Processor 30 categorizes the request into one of a plurality of predetermined workload groups. As previously mentioned, each workload group has its respective SLGs. These SLGs relate to response times and the like, and generally comprise levels of service that are expected from database systems 12 or 14 in the processing of a request 26. In determining which database system 12 or 14 should be selected to process a request 26, processor 30 is responsive to operational characteristics that indicate the ability of a particular database system 12 or 14 to process a request 26 belonging to a particular workload group in accordance with the SLGs of that workload group. For example, each database system 12 and 14 is operated under one of a group of predetermined system resource consumption rules sets. Processor 30 is initiated to recognize a particular rule set as being particularly suited to handling a certain workload mix.

As a simple example, consider two generic exemplary workload groups—tactical queries and background queries. Assume that rule set A is most suitable for handling tactical queries, and rule set B is most suitable for handling background queries. For the sake of the example, interface 16 has obtained data indicative of database system 12 operating under rule set A, and database system 14 operating under rule set B. A tactical query is received by interface 24, and recognized as a tactical query by processor 30. Processor 30 is then responsive to interface 24 for selecting database system 12 to process that tactical query.

The above example is over simplistic to a degree. In some circumstances, interface 16 obtains other operational characteristics of database system 12 that suggest it is not meeting SLGs for tactical queries. In such a case, processor 30 selects database system 14 for the tactical query. In practical terms, tactical queries are directed to database system 14 until interface 16 obtains data to which processor 30 is responsive for altering the procedure.

Monitor 20 is responsive to processor 30 for providing a signal 22 identifying these decisions. Using the above example, when processor 30 begins to send a stream of tactical queries to database system 14, the workload mix of database system 14 changes. As such, rule set B is not necessarily the optimal choice; in the present example, assume that rule set C is more suitable. In such a case, monitor 20 takes the pro-active step of sending a signal 22 to database system 14 and, in response, database system 14 adapts for operation under rules set C.

Processor 30 is responsive to whether SLGs for requests 26 are being met across the domain defined collectively by database systems 12 and 14. To this end, monitor 20 adjusts operational characteristics such as OpEnvs, SysCons, system states and/or rule sets for either or both of database systems 12 and 14. It will be appreciated that this assists in the provision of a domain wide approach to workload administration.

It will also be appreciated that, at a high level, the CLSM Regulator 10 monitors, on a short-term basis, the execution of requests to detect a deviation from the SLGs and, where a sufficient deviation is detected, the assignment of system resources to particular workload groups across the plurality of database systems 12 and 14 are adjusted to reduce the deviation.

Referring to FIGS. 2, 3, 4 and 5, embodiments will now be described with reference to a domain 34 comprised of a plurality of multiple dual-active database systems 36, wherein each of the dual-active database systems 36 is managed by one or more CLSM Regulators 38 and the domain 34 is managed by one or more multi-system Virtual Regulators 40.

Managing system resources on the basis of individual systems and requests does not, in general, satisfactorily manage complex workloads and SLGs across a domain 34 of database systems 36 in a multi-system environment. To automatically achieve workload goals in a multi-system environment, performance goals must first be defined (administered), then managed (regulated), and finally monitored across the entire domain (set of systems participating in an n-system environment).

Figure 2:
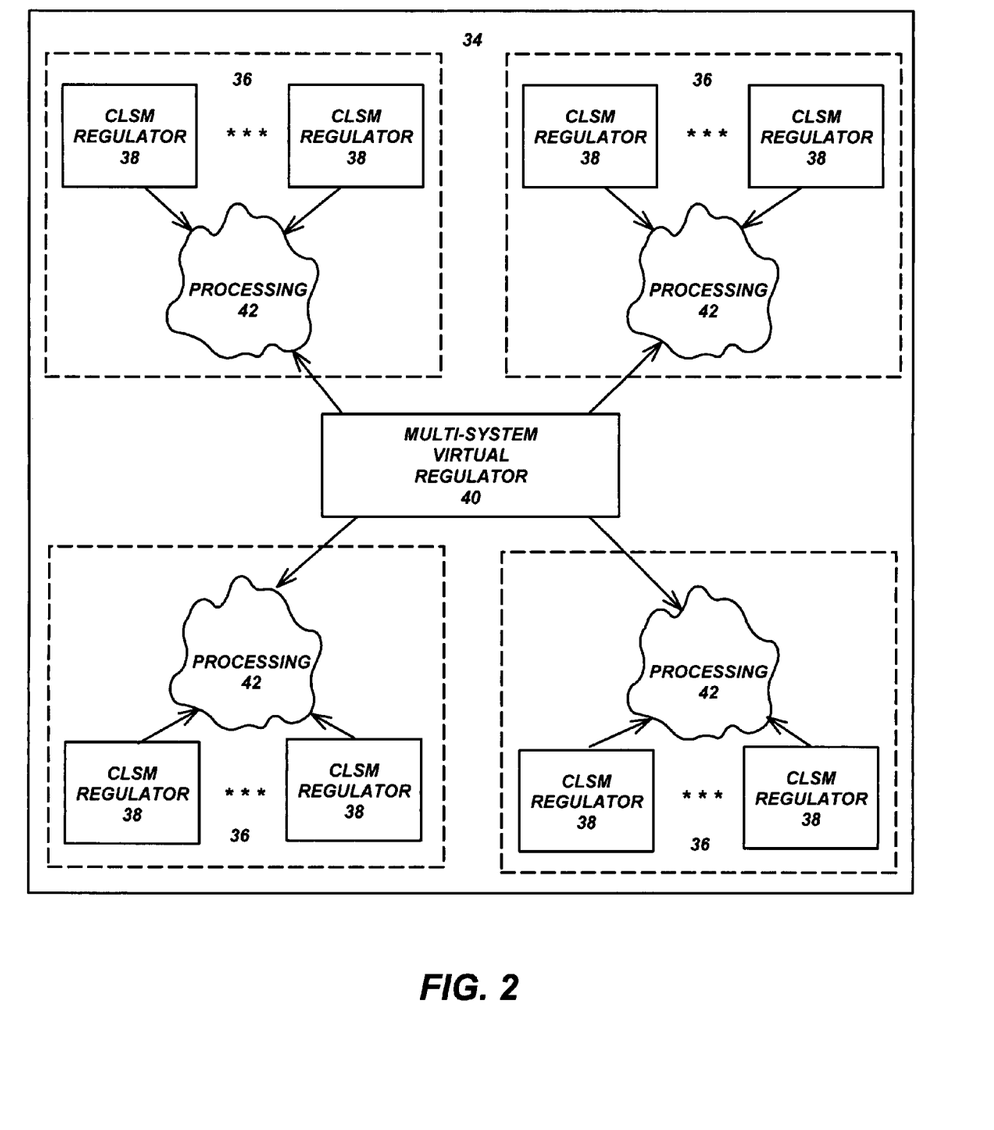
FIGS. 2, 3, 4 and 5 are block diagrams that illustrate the operation of a virtual regulator according to the preferred embodiment of the present invention.

CLSM Regulators 38 are used to manage workloads on an individual system 36 basis. Under the present embodiment, the Virtual Regulator 40 comprises a modified CLSM Regulator 38 implemented to enhance the CLSM architecture. That is, by extending the functionality of the CLSM Regulator 38 components, complex workloads are manageable across a domain 34.

The function of the Virtual Regulator 40 is to control and manage existing CLSM Regulators 38 across all systems 36 in a domain 34. The new functionality of the Virtual Regulator 38 extends the existing CLSM goal oriented workload management infrastructure, which is capable of managing various types of workloads encountered during processing 42.

In one embodiment, the Virtual Regulator 40 includes a "thin" version of a database system 36, where the "thin" database system 36 means a database system 36 executing in an emulation mode, such as described in U.S. Pat. Nos. 6,738,756, 7,155,428, 6,801,903 and 7,089,258. The query optimizer function of the "thin" database system 36 allows the Virtual Regulator 40 to classify received queries into "who, what, where" classification criteria, and allows the query director function of the "thin" database system 36 to perform the actual routing of the queries among multiple systems 36 in the domain 34. In addition, the use of the "thin" database system 36 in the Virtual Regulator 40 provides a scalable architecture, open application programming interfaces (APIs), external stored procedures (XSPs), user defined functions (UDFs), message queuing, logging capabilities, rules engines, etc.

The Virtual Regulator 40 also includes a set of open APIs, known as "Traffic Cop" APIs, that provide the Virtual Regulator 40 with the ability to monitor system 36 states, to obtain system 36 status and conditions, to activate inactive systems 36, to deactivate active systems 36, to set workload groups, to delay queries (i.e., to control or throttle throughput), to reject queries (i.e., to filter queries), to summarize data and statistics, and to create dynamic operating rules. The Traffic Cop APIs are also made available to the CLSM Regulators 38, thereby allowing the CLSM Regulators 38 and Virtual Regulator 40 to communicate this information between themselves in a multi-system domain 34.

Specifically, the Virtual Regulator 40 performs the following functions:

(a) Regulate (adjust) system 36 conditions (resources, settings, PSF weights, etc.) against workload expectations (SLGs) across the domain 34, and to direct query traffic to any of the systems 36 via a set of predefined rules.

(b) Monitor and manage system 36 conditions across the domain 34, including adjusting or regulating response time requirements by system 36, as well as using the Traffic Cop APIs to handle filter, throttle and/or dynamic allocation of resource weights within systems 36 and partitions so as to meet SLGs across the domain 34.

(c) Raise an alert to a database administrator for manual handling (e.g., defer or execute query, recommendation, etc.)

(d) Cross-compare workload response time histories (via a query log) with workload SLGs across the domain 34 to determine if query gating (i.e., flow control) through altered Traffic Cop API settings presents feasible opportunities for the workload.

(e) Manage and monitor the sub-system CLSM Regulators 38 across the domain 34 using the Traffic Cop APIs, so as to avoid missing SLGs on currently executing workloads, or to allow workloads to execute the queries while missing SLGs by some predefined or proportional percentage based on shortage of resources (i.e., based on predefined rules).

(f) Route queries (traffic) to available systems 36.

Although FIG. 2 depicts an implementation using a single Virtual Regulator 40 for the entire domain 34, in some exemplary environments, one or more backup Virtual Regulators 40 are also provided for circumstances where the primary Virtual Regulator 40 malfunctions or is otherwise unavailable. Such backup Virtual Regulators 40 may be active or may remain dormant until needed.

Figure 3:
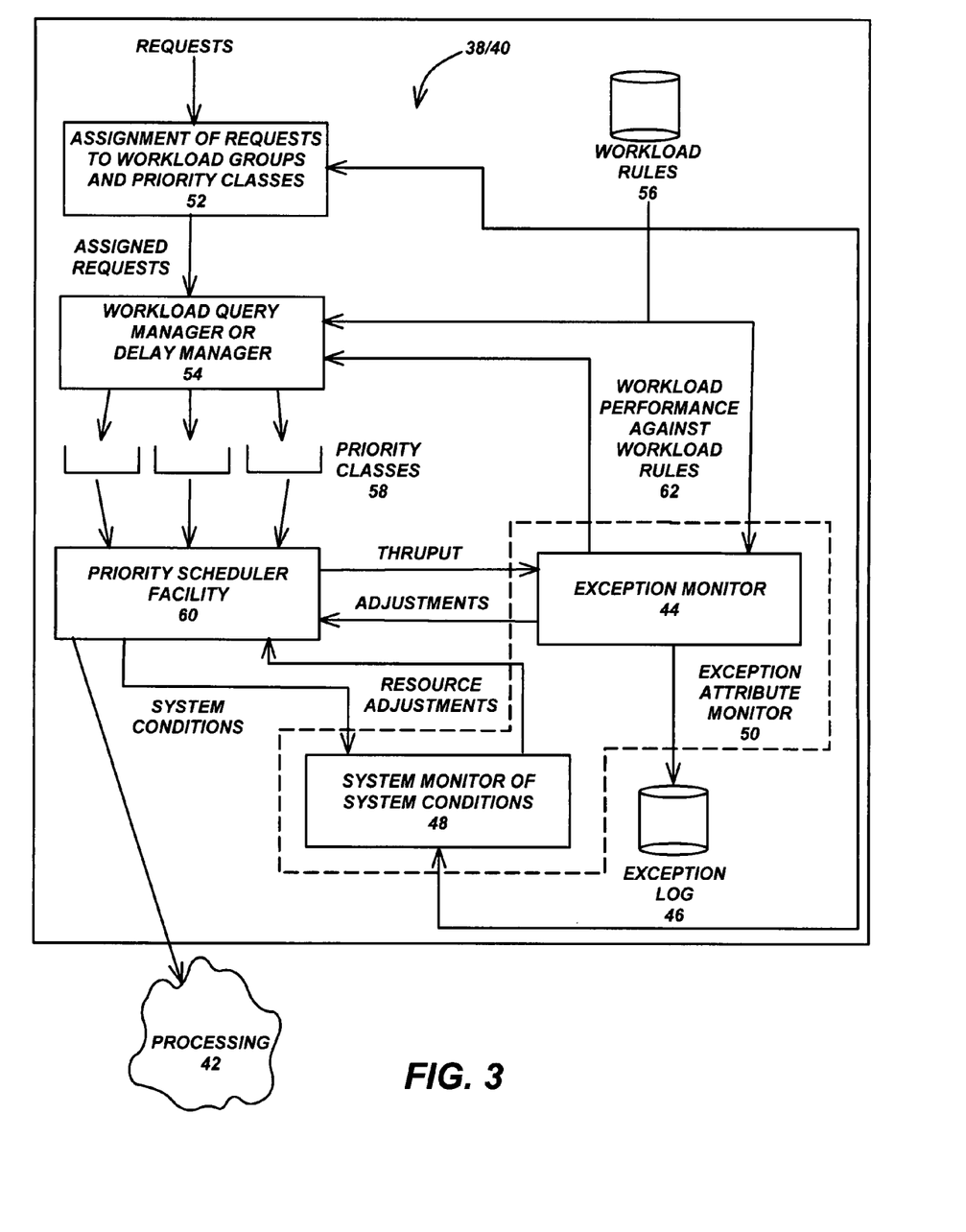

Referring to FIG. 3, both the CLSM Regulator 38 and Virtual Regulator 40 include an exception monitor 44 for detecting workload exceptions, which are recorded in a log 46. A system condition monitor 48 is provided to detect system 36 conditions, such as node failures. These collectively define an exception attribute monitor 50.

In practice, both the CLSM Regulator 38 and Virtual Regulator 40 receive requests, and assign these requests into their respective workload groups and priority classes at 52. The assigned requests are then passed through a workload query manager 54, also known as a delay manager. The workload query manager 54 is responsive to workload rules 56 and exception monitor 44 for either passing a request on or placing it in a queue until predetermined conditions are met.

If passed, the requests are split into their priority classes 58 for handling by PSF 60. PSF 60 is responsive to the priority classes 58 for providing the requests in accordance with predefined principles for processing at 42. These principles are updated over time in response to system monitor 48 and exception monitor 44. PSF 60 reports observed system 36 conditions to monitor 48 and throughput information to monitor 44, which are responsive to such information for updating the principles under which the PSF 60 operates.

Both the CLSM Regulator 38 and Virtual Regulator 40 use a set of user-defined rules 56, or heuristics, to guide a feedback mechanism that manages the throughput of a workload for each workload group defined in the system. In general, Virtual Regulator 40 provides a single view of managing workloads and the associated rules 56 across the domain 34. Meanwhile, CLSM Regulators 38 continue to support workloads in a CLSM environment running on each system 36 defined in domain 34.

The Virtual Regulator 40 manages PSF 60 settings and workload groups by controlling CLSM Regulators 38 and/or adjusting workload rules 56 in order to achieve SLGs. It also monitors operational characteristics, such as system 36 conditions, exceptions, system 36 failures, workload exceptions and the like. Further, it controls the amount of work allowed into each system 36 to meet SLGs across domain 34.

The Virtual Regulator 40 gathers system 36 information by broadcasting to all CLSM Regulators 38 in domain 34 a request that they report their current status. This will be recognized as the functionality of interface 16 in FIG. 1.

Figure 4:
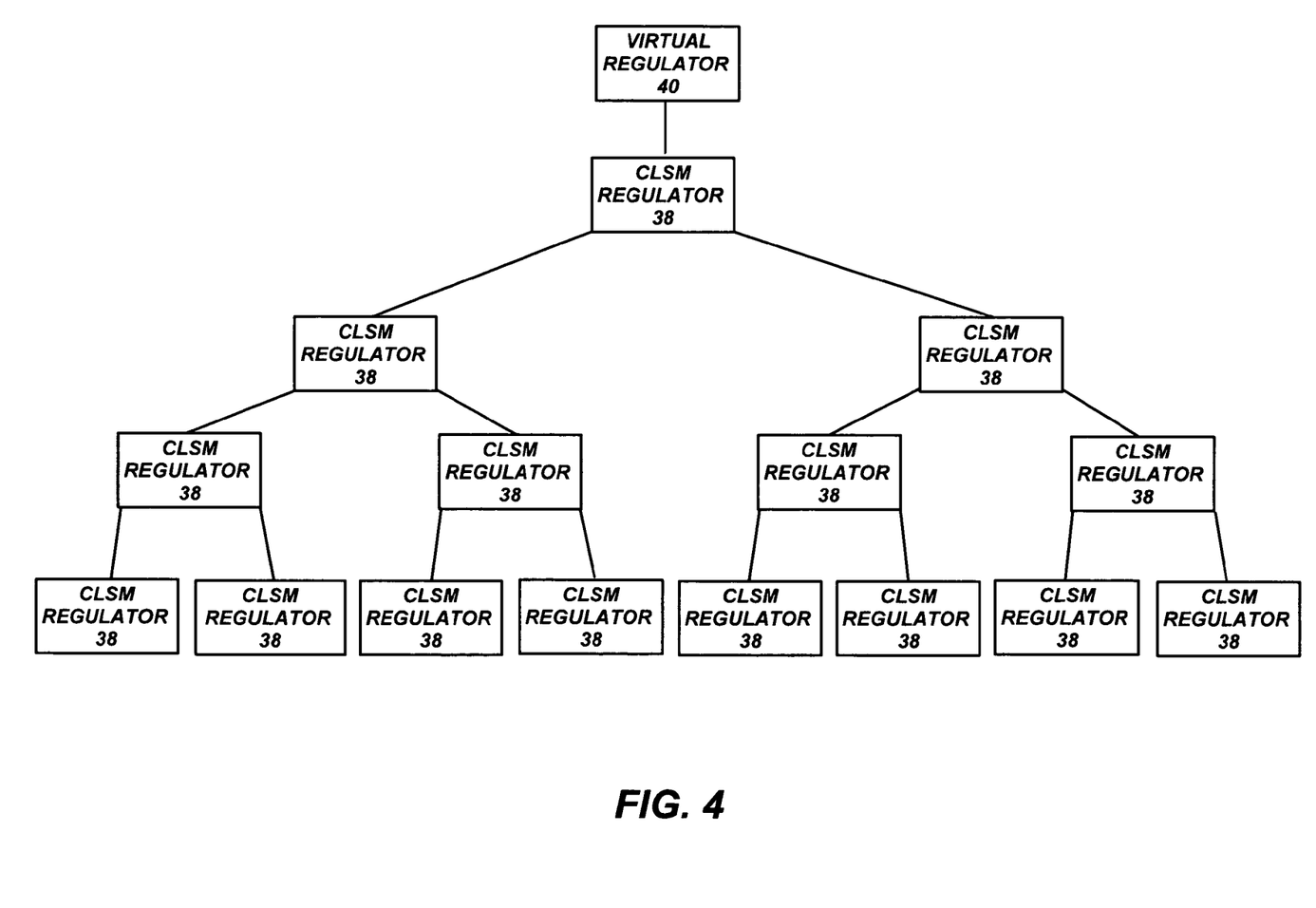

In some embodiments, each system 36 may have superordinate and subordinate systems 36, and so on. An example of this is shown in FIG. 4, which illustrates a tree structure. In such embodiments, each CLSM Regulator 38 gathers information related to its own systems 36, as well as that of its children CLSM Regulators 38, and reports the aggregated information to its parent CLSM Regulator 38 or the Virtual Regulator 40 at the highest level of the tree. In some cases, each CLSM Regulator 38 waits until it has received information from its children CLSM Regulators 38 before forwarding the aggregated information to its parent CLSM Regulator 38 or the Virtual Regulator 40. In that way, the system 36 information is compiled from the bottom of the tree to the top. When the Virtual Regulator 40 compiles its information with that which is reported by all of the CLSM Regulators 38, it will have complete information for domain 34. The Virtual Regulator 40 analyzes the aggregated information to apply rules and make adjustments.

In the example shown in FIG. 4, the tree is a binary tree. It will be understood that other types of trees will fall within the scope of this broad invention. Further, while the tree in FIG. 4 is symmetrical, symmetry is not a limitation.

In another example system, each CLSM Regulator 38 communicates its system 36 information directly to the Virtual Regulator 40. The Virtual Regulator 40 compiles the information, adds domain 34 or additional system 36 level information, to the extent there is any, and makes its adjustments based on the resulting set of information.

Each CLSM Regulator 38 monitors and controls, in a closed loop fashion, workload group performance information for a single system 36 or dual-active system 36. For example, this may require performance information received from a dispatcher processor, wherein the performance information is compared to SLGs 62. In the example of throughput information, the level of desired throughput defined in SLGs 62 is compared to the actual level of throughput occurring for a particular workload. The Virtual Regulator 40 then adjusts resource allocation weights to better meet the workload rules.

Figure 5:
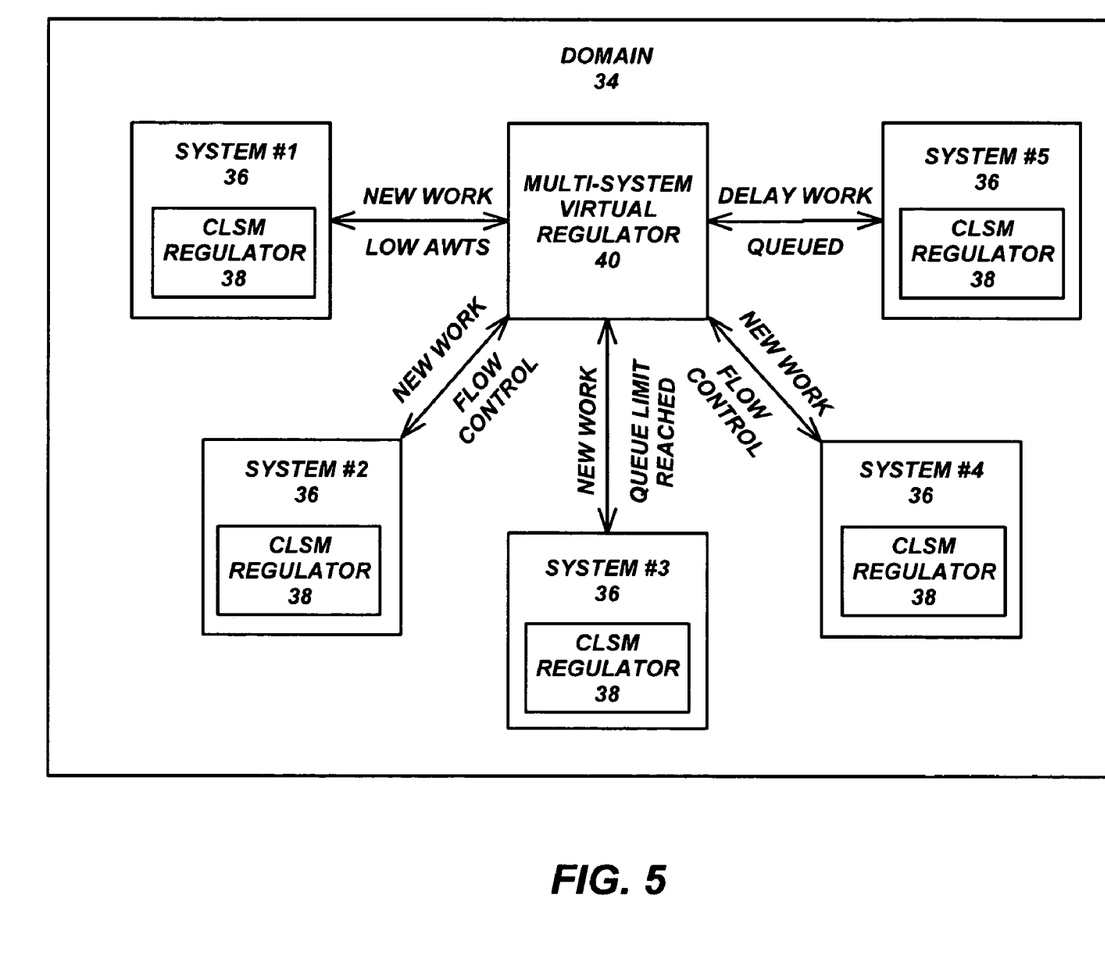

Referring to FIG. 5, the Virtual Regulator 40 receives information concerning the states, events and conditions of the systems 36 from the CLSM Regulators 38, and compares these states, events and conditions to the SLGs 62. In response, the Virtual Regulator 40 adjusts the operational characteristics of the various systems 36 through a set of "Traffic Cop" Open APIs to better address the states, events and conditions of the systems 36 throughout the domain 34.

To manage workloads among dynamic domain 34 wide situations, the Virtual Regulator 40 classifies the various states, events and conditions into at least three general detection categories and specifies what automated actions should occur in response thereto, as set forth below:

1. Detection category: system, device or application state.
   a. This category detects the state of a system 36, device or application (e.g., down, recovered, degraded, etc.), as communicated through a monitored message queue.
2. Detection category: system, device or application event.
   a. One event detected is an operating window time boundary.
   b. Another event detected is when an application, device or system is started or ended (as communicated through a monitored message queue). For example, in order for a request to the database system 36 to enter, initiate or continue under a given workload group, it can be additionally pre-qualified to satisfy one or more event-based "when" conditions.

An example of the types of events supported includes "daily load against table X is about to start." This event triggers a phased set of actions: (a) begin acquisition phase of multi-load to table X, (b) promote the priority of all queries that involve table X, (c) at the same time, restrict the ability for new queries involving table X from starting until after the data load is completed (do this through delay, scheduling or disallowing the query upon request), (d) after y minutes or upon completion of the acquisition phase (which ever comes later), previously promoted queries that are still running are aborted ("times up!"), (e) begin the apply phase of the data load, and (f) upon completion of data load, raise restrictions on queries involving table X, and allow scheduled and delayed queries to resume.

Another example is to allow the user to define and automate workload group changes based on an event (rather than resource or time changes per the PSF 60). For example, customers may like to have workload groups change when the daily load application is submitted to the system 36, or based on a business calendar that treats weekends and holidays differently from weekdays, or that treats normal processing differently from quarterly or month-end processing.

What is different about this type of initiation is that it may mean one query or event can have an impact on other queries already in execution or that will soon be requested.
   c. Another event detected is sustained CPU and I/O for some qualifying time, e.g., either high or low. For example, the category may initiate background tasks when system 36 utilization is low, and eliminate them when system 36 utilization is high.

d. User-definable event.

e. Replication service.

f. Other events.

3. Detection category: system, device or application condition. These conditions are detected by an individual request or workload group being impacted (e.g., average response time greater than the SLG for some qualifying interval) by a condition and can be implemented through existing exception monitoring rather than more difficult domain 34 wide detection. Preferably, there are "symptom" and "cause" conditions:

a. Symptom: response time greater than x.

b. Symptom: block time greater than x.

c. Cause: low or no AWT availability for some time period.

d. Cause: arrival rate greater than expected (e.g., a surge).

e. Cause: response time for all workload groups exceeded.

f. Cause: response time for one workload group exceeded.

4. Automated actions. Upon detection of any of the above states, events, or conditions, one or more automated actions can be triggered by the Virtual Regulator 40 or CLSM Regulator 38. Automated actions may include (but are not limited to) the following:

a. Alerting an operator.

b. Notifying one or more systems 36.

c. Logging the states, events and conditions.

d. Changing the rules for one or more workload groups.

e. Re-routing one or more workload groups to other systems.

f. Aborting one or more workload groups.

Alternatively, there may be some other action taken in order to automatically resolve the detected category. Moreover, many other categories of detections and automated actions can be implemented.

Generally speaking, CLSM Regulators 38 provide real-time closed-loop system management over resources within the systems 36, with the loop having a fairly narrow bandwidth, typically on the order of milliseconds, seconds, or minutes. The Virtual Regulator 40 provides real-time closed-loop system management over resources within the domain 34, with the loop having a much larger bandwidth, typically on the order of minutes, hours, or days.

Further, while CLSM Regulators 38 controls resources within the systems 36, and the Virtual Regulator 40 controls resources across the domain 34, in many cases, system 36 resources and domain 34 resources are the same. The Virtual Regulator 40 has a higher level view of resources within the domain 34, because it is aware of the state of resources of all systems 36, while each CLSM Regulator 38 is generally only aware of the state of resources within its own systems 36.

There are a number of techniques by which Virtual Regulator 40 implements its adjustments to the allocation of system 36 resources. For example, and as illustrated in FIG. 2, the Virtual Regulator 40 communicates adjustments directly to CLSM Regulators 38, and the CLSM Regulators 38 then apply the relevant rule adjustments. Alternatively, the Virtual Regulator 40 communicates adjustments to the CLSM Regulators 38 by passing them down a tree, such as that in FIG. 4. In either case, the CLSM Regulators 38 incorporate adjustments ordered by the Virtual Regulator 40 in the various systems 36.

Given that the Virtual Regulator 40 has access to the state, event and condition information from all CLSM Regulators 38, it can make adjustments that are mindful of meeting SLGs for various workload groups. It is capable of, for example, adjusting the resources allocated to a particular workload group on a domain 34 basis, to make sure that the SLGs for that workload group are met. It is further able to identify bottlenecks in performance and allocate resources to alleviate the bottleneck. Also, it selectively deprives resources from a workload group that is idling resources. In general, the Virtual Regulator 40 provides a domain 34 view of workload administration, while the CLSM Regulators 38 provide a system 36 view of workload administration.

Thus, it will be appreciated that the illustrated Virtual Regulator 40 is capable of monitoring the performance and operational characteristics of a plurality of systems 36 across a domain 34. From this, it provides a domain 34 based approach to resource and performance management.

Parallel Virtual Optimization

Figure 6:
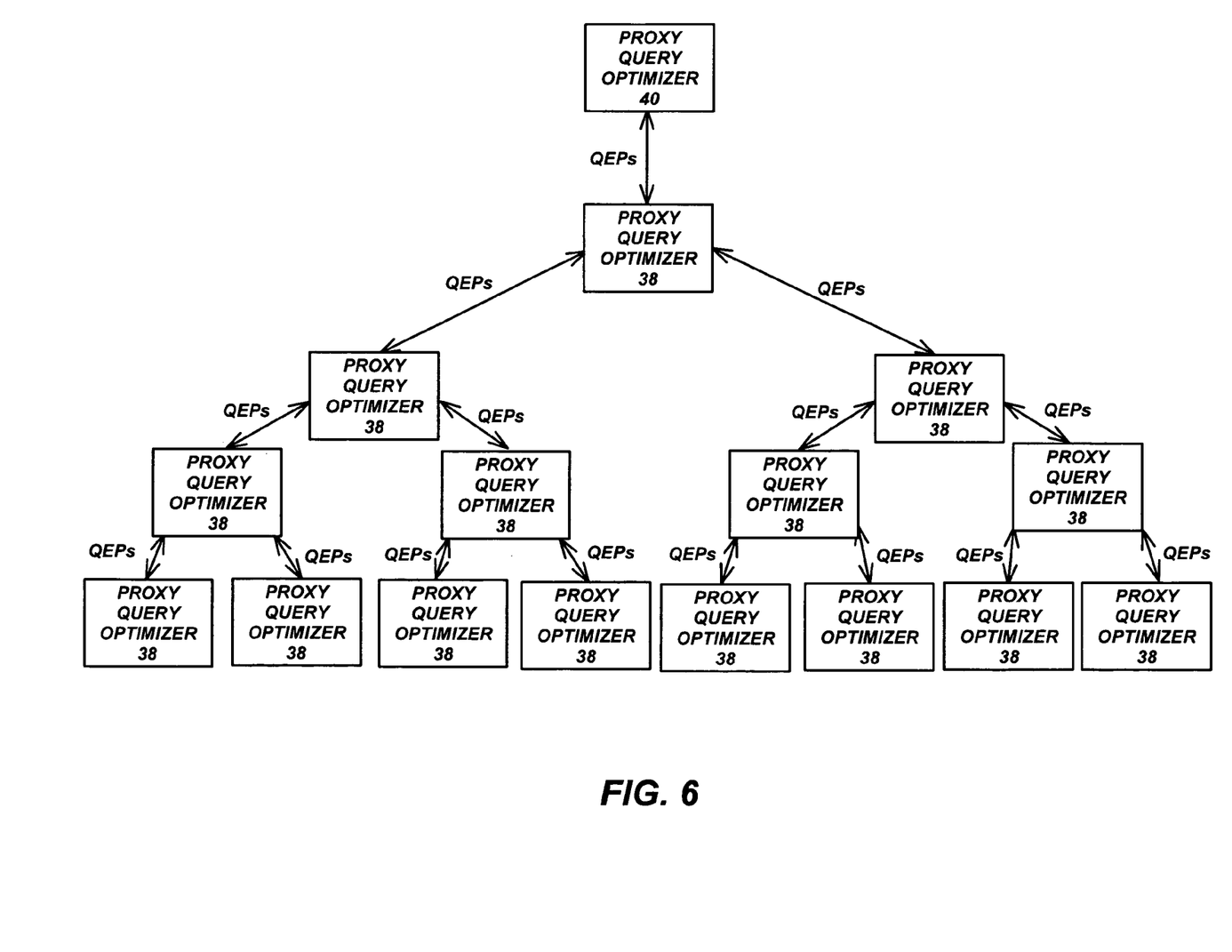
FIG. 6 is a block diagram that illustrates the operation of the proxy query optimizers according to the preferred embodiment of the present invention.

FIG. 6 is a block diagram that illustrates the operation of the proxy query optimizers according to the preferred embodiment of the present invention. The present invention includes, within the CLSM Regulators 38 and Virtual Regulator 40, proxy query optimizers that emulate a query optimizer function found in the database systems 36, with respect to the specific functionality of query execution plan (QEP) evaluation and search, in order to perform parallel virtual optimization of the database queries performed by the database systems 36 within the domain 34. However, these proxy query optimizers may or may not support any other functionality of the database systems 36. In other words, these proxy query optimizers do not need to have the complete functionality of a query optimizer function of the database systems 36.

Preferably, the proxy query optimizers within the CLSM Regulators 38 and Virtual Regulator 40 execute in parallel, and each of the proxy query optimizers is assigned a different portion of a QEP space to explore. The division of the QEP space among the proxy query optimizers may be performed automatically or may be specified by an operator using directives or other means.

Consequently, the present invention relies on the ability to virtualize the query optimizer function found in the database systems 36, include it within the CLSM Regulators 38 and Virtual Regulator 40, and direct it to search a portion of the QEP space. Virtualizing the query optimizer function found in the database systems 36 can be accomplished through software enhancement or by running each proxy query optimizer encapsulated in its own virtual machine.

Since the proxy query optimizers are a component of the CLSM Regulator 38 and the Virtual Regulator 40, they can be arranged in a tree, as shown in FIG. 6 in a manner similar to FIG. 4, which is used both for dividing the QEP space and for merging results to find a superior QEP. The top element in the tree, namely the Virtual Regulator 40, is assigned the QEP space in its entirety and may divide the QEP space into a portion to retain for itself and a remaining portion that is further divided between subordinate CLSM Regulators 38. Alternatively, the Virtual Regulator 40 is assigned the QEP space in its entirety and may divide the QEP space between subordinate CLSM Regulators 38.

In turn, each of the subordinate CLSM Regulators 38 may divide their assigned portion of the QEP space into a portion to retain for itself and a remaining portion that is further divided between subordinate CLSM Regulators 38, until the bottom of the tree is reached, at which point there are no subordinate CLSM Regulators 38, and there is no further attempt to divide the QEP space. Alternatively, each of the subordinate CLSM Regulators 38 may divide the QEP space between subordinate CLSM Regulators 38.

Each proxy query optimizer explores its portion of the QEP space and upon completion of its analysis, or expiration of a specified resource or time period, submits its best QEP to its superordinate proxy query optimizer for comparison with the QEPs submitted by other proxy query optimizers, so that the best QEP identified by all of the proxy query optimizers is communicated to the proxy query optimizer of the Virtual Regulator 40. The Virtual Regulator 40 communicates the best QEP to a query optimizer function of the database system(s) 36 actually performing the query, which may then bypass their own QEP search.

It should be clear that communication between a child and parent proxy query optimizer is required. A variety of mechanisms are possible for such communication, including message passing, shared memory, etc., although the exact communication mechanism does not further limit the present invention.

In summary, the present invention uses parallel proxy query optimization to identify better QEPs than might be identified with a single optimizer. The present invention offers an advantage in cases where the computational costs of a more thorough plan search is less than the total differential computational plus I/O costs of executing a superior QEP to the QEP that would have been selected by a single database system 36.

CONCLUSION

This concludes the description of the preferred embodiment of the invention. The following describe some alternative embodiments for accomplishing the same invention.

The invention has been primarily developed for monitoring and adjusting the operational characteristics of a plurality of systems within a domain. However, it will be appreciated that the invention is in no sense limited to that application. For example, the invention is generally applicable to a wide variety of environments where such functionality has value.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A system for managing a plurality of database systems, comprising:
   (a) a domain comprised of a plurality of database systems, wherein each of the database systems performs database queries to retrieve data stored by the database systems;
   (b) one or more virtual regulators, performed by one or more processors, for managing the domain; and
   (c) one or more closed-loop system management (CLSM) regulators, performed by one or more processors, for managing each of the database systems in the domain;
   (d) wherein both the virtual regulators and CLSM regulators perform parallel virtual optimization of the database queries performed by the database systems;
   (e) wherein the virtual regulators and CLSM regulators include proxy query optimizers that emulate a query optimizer function found in the database systems;
   (f) wherein the proxy query optimizers in the virtual regulators and CLSM regulators execute in parallel, and each of the proxy query optimizers is assigned a different portion of a query execution plan space to explore; and
   (g) wherein each proxy query optimizer explores its portion of the query execution plan space and upon completion of its analysis or expiration of a specified resource or time period, submits its best query execution plan to its superordinate proxy query optimizer for comparison with the query execution plans submitted by other proxy query optimizers, in order that the best query execution plan identified by all of the proxy query optimizers is communicated to the proxy query optimizer of the virtual regulator.

2. The system of claim 1, wherein the proxy query optimizers are arranged in a tree, which is used both for dividing the query execution plan space and for merging results to find a superior query execution plan.

3. The system of claim 1, wherein the virtual regulator is assigned the query execution plan space in its entirety and divides the query execution plan space into a portion to retain for itself and a remaining portion that is further divided between subordinate CLSM regulators.

4. The system of claim 3, wherein each of the subordinate CLSM regulators divides the query execution plan space into a portion to retain for itself and a remaining portion that is further divided between subordinate CLSM regulators.

5. The system of claim 3, wherein each of the subordinate CLSM regulators divides the query execution plan space between subordinate CLSM regulators.

6. The system of claim 1, wherein the virtual regulator is assigned the query execution plan space in its entirety and divides the query execution plan space between subordinate CLSM regulators.

7. The system of claim 6, wherein each of the subordinate CLSM regulators divides the query execution plan space into a portion to retain for itself and a remaining portion that is further divided between subordinate CLSM regulators.

8. The system of claim 6, wherein each of the subordinate CLSM regulators divides the query execution plan space between subordinate CLSM regulators.

9. The system of claim 1, wherein the virtual regulator communicates the best query execution plan to a query optimizer function of the database systems actually performing the query, which may then bypass their own query execution plan search.

10. A method of managing a domain comprised of a plurality of database systems, wherein each of the database systems performs database queries to retrieve data stored by the database systems, the method comprising:
    (a) managing the domain using one or more virtual regulators performed by one or more processors; and
    (b) managing each of the database systems in the domain using one or more closed-loop system management (CLSM) regulators performed by one or more processors;
    (c) wherein both the virtual regulators and CLSM regulators perform virtual parallel optimization of the database queries performed by the database systems;
    (d) wherein the virtual regulators and CLSM regulators include proxy query optimizers that emulate a query optimizer function found in the database systems;
    (e) wherein the proxy query optimizers in the virtual regulators and CLSM regulators execute in parallel, and each of the proxy query optimizers is assigned a different portion of a query execution plan space to explore; and
    (f) wherein each proxy query optimizer explores its portion of the query execution plan space and upon completion of its analysis or expiration of a specified resource or time period, submits its best query execution plan to its superordinate proxy query optimizer for comparison with the query execution plans submitted by other proxy query optimizers, in order that the best query execution plan identified by all of the proxy query optimizers is communicated to the proxy query optimizer of the virtual regulator.

11. The method of claim 10, wherein the proxy query optimizers are arranged in a tree, which is used both for dividing the query execution plan space and for merging results to find a superior query execution plan.

12. The method of claim 10, wherein the virtual regulator is assigned the query execution plan space in its entirety and divides the query execution plan space into a portion to retain for itself and a remaining portion that is further divided between subordinate CLSM regulators.

13. The method of claim 12, wherein each of the subordinate CLSM regulators divides the query execution plan space into a portion to retain for itself and a remaining portion that is further divided between subordinate CLSM regulators.

14. The method of claim 12, wherein each of the subordinate CLSM regulators divides the query execution plan space between subordinate CLSM regulators.

15. The method of claim 10, wherein the virtual regulator is assigned the query execution plan space in its entirety and divides the query execution plan space between subordinate CLSM regulators.

16. The method of claim 15, wherein each of the subordinate CLSM regulators divides the query execution plan space into a portion to retain for itself and a remaining portion that is further divided between subordinate CLSM regulators.

17. The method of claim 15, wherein each of the subordinate CLSM regulators divides the query execution plan space between subordinate CLSM regulators.

18. The method of claim 10, wherein the virtual regulator communicates the best query execution plan to a query optimizer function of the database systems actually performing the query, which may then bypass their own query execution plan search.

* * * * *